United States Patent
Bulan et al.

(10) Patent No.: US 10,044,988 B2
(45) Date of Patent: Aug. 7, 2018

(54) MULTI-STAGE VEHICLE DETECTION IN SIDE-BY-SIDE DRIVE-THRU CONFIGURATIONS

(71) Applicant: Xerox Corporation, Norwalk, CT (US)

(72) Inventors: Orhan Bulan, Henrietta, NY (US); Aaron M. Burry, Ontario, NY (US)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 316 days.

(21) Appl. No.: 14/715,787

(22) Filed: May 19, 2015

(65) Prior Publication Data

US 2016/0342841 A1 Nov. 24, 2016

(51) Int. Cl.
| | |
|---|---|
| H04N 7/18 | (2006.01) |
| G06Q 50/12 | (2012.01) |
| G06Q 30/06 | (2012.01) |
| G06K 9/62 | (2006.01) |
| G06K 9/00 | (2006.01) |

(52) U.S. Cl.
CPC ......... *H04N 7/181* (2013.01); *G06K 9/00785* (2013.01); *G06K 9/6254* (2013.01); *G06Q 30/0635* (2013.01); *G06Q 50/12* (2013.01)

(58) Field of Classification Search
CPC ............. G06K 9/00785; G06K 9/6254; G06Q 30/0635; G06Q 50/12; H04N 7/181
See application file for complete search history.

(56) References Cited

U.S. PATENT DOCUMENTS

| | | | |
|---|---|---|---|
| 4,878,248 A * | 10/1989 | Shyu ........................ | G06K 9/32 |
| | | | 382/105 |
| 5,168,354 A | 12/1992 | Martinez et al. | |
| 6,696,945 B1 | 2/2004 | Venetianer et al. | |
| 6,970,083 B2 | 11/2005 | Venetianer et al. | |
| 7,119,351 B2 | 10/2006 | Woelki | |
| 7,609,173 B2 | 10/2009 | Vanderwall et al. | |
| 8,108,119 B2 * | 1/2012 | Southall ................... | B60T 7/22 |
| | | | 382/103 |
| 8,401,230 B2 * | 3/2013 | Kozitsky .............. | G06Q 10/087 |
| | | | 382/103 |
| 8,774,462 B2 | 7/2014 | Kozitsky et al. | |
| 2005/0073585 A1 | 4/2005 | Ettinger et al. | |

(Continued)

FOREIGN PATENT DOCUMENTS

WO 03/032622 4/2003

OTHER PUBLICATIONS

U.S. Appl. No. 14/632,587, filed Feb. 26, 2015, Bulan et al.

*Primary Examiner* — Peter D Le
(74) *Attorney, Agent, or Firm* — Kermit D. Lopez; Luis M. Ortiz; Ortiz & Lopez, PLLC

(57) ABSTRACT

Multi-stage vehicle detection systems and methods for side-by-side drive-thru configurations. One or more video cameras (or an image-capturing unit) can be employed for capturing video of a drive-thru of interest in a monitored area. A group of modules can be provided, which define multiple virtual detection loops in the video and sequentially perform classification with respect to each virtual detection loops among the multiple virtual detection loops, starting from a virtual detection loop closest to an order point, and when a vehicle having a car ID is sitting in a drive-thru queue, so as to improve vehicle detection performance in automated post-merge sequencing.

17 Claims, 4 Drawing Sheets

(56) References Cited

U.S. PATENT DOCUMENTS

| | | | |
|---|---|---|---|
| 2006/0140450 A1* | 6/2006 | Hong | G06K 9/00335 |
| | | | 382/107 |
| 2007/0168202 A1 | 7/2007 | Changela et al. | |
| 2008/0025568 A1* | 1/2008 | Han | G06K 9/4642 |
| | | | 382/103 |
| 2009/0287550 A1 | 11/2009 | Jennings | |
| 2012/0106781 A1* | 5/2012 | Kozitsky | G06Q 10/087 |
| | | | 382/103 |
| 2013/0204719 A1 | 8/2013 | Burry et al. | |
| 2014/0114711 A1 | 4/2014 | Burns et al. | |
| 2015/0054957 A1 | 2/2015 | Gross et al. | |
| 2015/0070471 A1 | 3/2015 | Loce et al. | |

\* cited by examiner

MULTI-STAGE VEHICLE DETECTION IN SIDE-BY-SIDE DRIVE-THRU CONFIGURATIONS

TECHNICAL FIELD

Embodiments are generally related to the field of vehicle recognition. Embodiments are additionally related to techniques for improving efficiencies in side-by-side drive-thru configurations associated with business establishments.

BACKGROUND OF THE INVENTION

Some establishments that offer goods for sale have incorporated a drive-thru arrangement that allows individuals to stay in their vehicles throughout the process of ordering and picking up the contents of orders. For example, some fast food restaurants offer a drive-thru window that allows customers to order food and a pick-up window that allows the customers to pick up the food after ordering. The efficient handling of the flow of vehicles through a drive-thru is vital in securing more revenue and retaining more customers.

To improve drive-thru efficiency, some establishments have incorporated remote or Internet-based order placement by customers. In particular, the customer who places a remote order can forego placing the order on-site and can instead pick up the order directly from a pick-up window. There are drawbacks, however, in current implementations of the remote ordering systems. In particular, the establishment starts preparing the order contents once the customer arrives at the pick-up window or otherwise notifies the establishment that he/she is ready to pick up the order. For example, a fast food restaurant can start to prepare food associated with a remotely placed food order once the customer arrives at the pick-up window of the restaurant. Accordingly, the customer must wait for the establishment to prepare and assemble the order.

Due to its increased customer throughput relative to traditional configurations, the side-by-side drive-thru configuration has become a standard configuration in many newly built fast food restaurants and other establishments, as well as a configuration to which many existing restaurants are migrating. While it has benefits regarding the maximum drive-thru customer per hour rate that a restaurant can achieve (thus reducing the number of "drive-off" occurrences in which a customer arrives, concludes that the line is too long or has to wait longer than planned, and so decides to leave), it presents new challenges to restaurant managers.

One such challenge is the determination of the right order sequence, as vehicles can become shuffled between the time the order is placed and the time the customer receives the order, due to the parallel nature of the configuration. Since the line starts as a single lane that splits into two separate lanes with ordering consoles, and then the two lanes merge again into a single lane for payment and pickup, the two separate ordering points and re-merging of the lanes can cause a mismatch between the sequence in which the orders were taken and the sequence of cars that arrive at the pay and pickup counters.

This "out of sequencing" can result in the wrong expenses charged to the customer and/or the delivery of the wrong food to the customer (contributing significantly to customer dissatisfaction). Even if the accuracy of the delivered orders is maintained, these out of sequence events result in significant time loss (inefficiency) as the employees re-sequence the orders to match the vehicles in the queue. With roughly 75% of the business of many fast food restaurants being drive-thru, improving operational efficiency and therefore increasing drive-thru volumes provides an opportunity for significant business impact.

In order to enhance efficiencies in drive-thru implementations, it is believed that analyzing data from a side-by-side (i.e., parallel dual order point) drive-thru may be useful in order to develop an automated method for accurately determining the post-merge vehicle sequence using a video camera. Such an approach can identify the cars at each order point and then tracks them through the merge into a single lane for payment and pickup. This approach can operate in a manner that a vehicle ID (Identification) is assigned to a vehicle at the order point through the restaurant point of sale (POS) system when an order is taken. The car ID associated with the vehicle is taken as an input to the computer vision algorithm and reported to indicate the merge event for this vehicle. When a car ID is sitting in the queue, the algorithm tries to detect the vehicle at the order point through a classifier.

This, however, is not always possible due to vehicle-to-vehicle occlusions as shown in FIG. 1, for example, which depicts occlusions from the signage near the order point as shown in the sample image 26, or due to delays in the car ID assignment as shown in the sample image 28, in which case the car will have left the order point by the time car ID is assigned. This results in missed detections of vehicles and can cause pending car IDs to stack up at the order point.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved vehicle detection system and method.

It is another aspect of the disclosed embodiments to provide for a system and method for improving efficiencies in vehicle detection employed in side-by-side drive-thru configurations.

The aforementioned aspects and other objectives and advantages can now be achieved as described herein. Multi-stage vehicle detection systems and methods for side-by-side drive-thru configurations are disclosed. One or more video cameras (or an image-capturing unit) can be employed for capturing video of a drive-thru of interest in a monitored area. A group of modules can be provided, which define multiple virtual detection loops in the video and sequentially perform classification with respect to each virtual detection loop among the multiple virtual detection loops starting from a virtual detection loop closest to an order point and when a vehicle having a car ID is sitting in a drive-thru queue, so as to improve vehicle detection performance in automated post-merge sequencing.

The group of modules can include, but are not limited to, a video acquisition module including the aforementioned video camera(s) that acquires the video of the drive-thru of interest; a vehicle detection module that defines the multiple virtual detection loops in the video and sequential classification in the virtual detection loops to detect vehicles as they are assigned to the car ID at the order point; a vehicle tracking module that tracks detected vehicles until the detected vehicles leave the monitored area; and a sequence reporting module that reports an assigned card ID and originating lanes as vehicles proceed through a cash out point.

Additionally, one or more classifiers provided and an offline stage implemented, wherein features of manually labeled samples of vehicles crossing the virtual detection loops are extracted and fed into the classifier(s) for training and wherein the classifier(s) after training is employed within the system. The classifier(s) may be, for example, an order point classifier and a merge point classifier.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
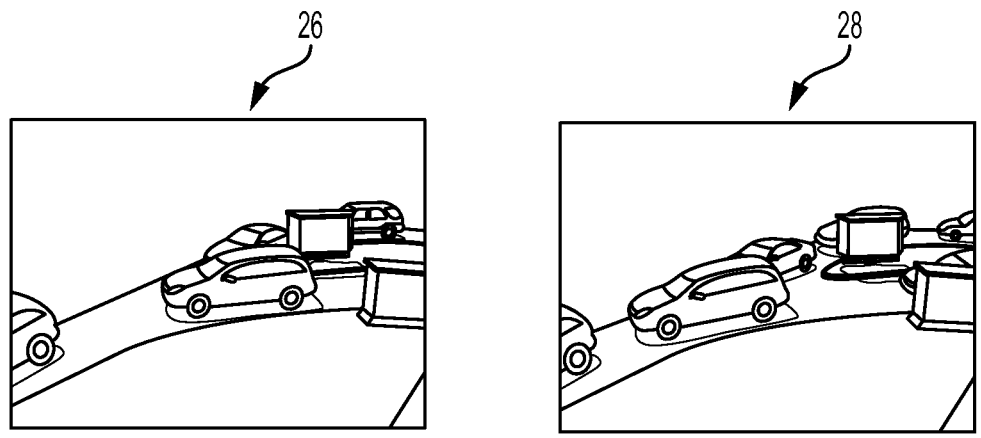
FIG. 1 illustrates sample images of vehicle-to-vehicle occlusions on a side-by-side drive-thru lane.

The particular values and configurations discussed in these non-limiting examples can be varied and are cited merely to illustrate at least one embodiment and are not intended to limit the scope thereof.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Embodiments generally relate to systems and methods for processing orders associated with an establishment. More particularly, a customer of the establishment can remotely submit an order for goods and/or services offered by the establishment, whereby the order can indicate a license plate number associated with the customer. Further, an image-capturing device of the establishment can be configured to capture images of a vehicle on a premise of the establishment. Additionally, a module or other logic can receive image data from the image-capturing device and can perform image-processing techniques on the image data to determine license plate data associated with the vehicle.

By incorporating the systems and methods, establishments and their customers can realize various benefits. For example, the time necessary to process drive-thru orders can be decreased and the establishment, resulting in increased revenue, can process more total orders. Further, the systems and methods can reduce the inconvenience for the customer by not requiring additional actions subsequent to placing the order and ensuring that the orders are added to a priority queue in a timely fashion upon the customer's arrival. Accordingly, the establishments can realize increased customer retention. It should be appreciated that other benefits of the systems and methods are envisioned.

Figure 2:
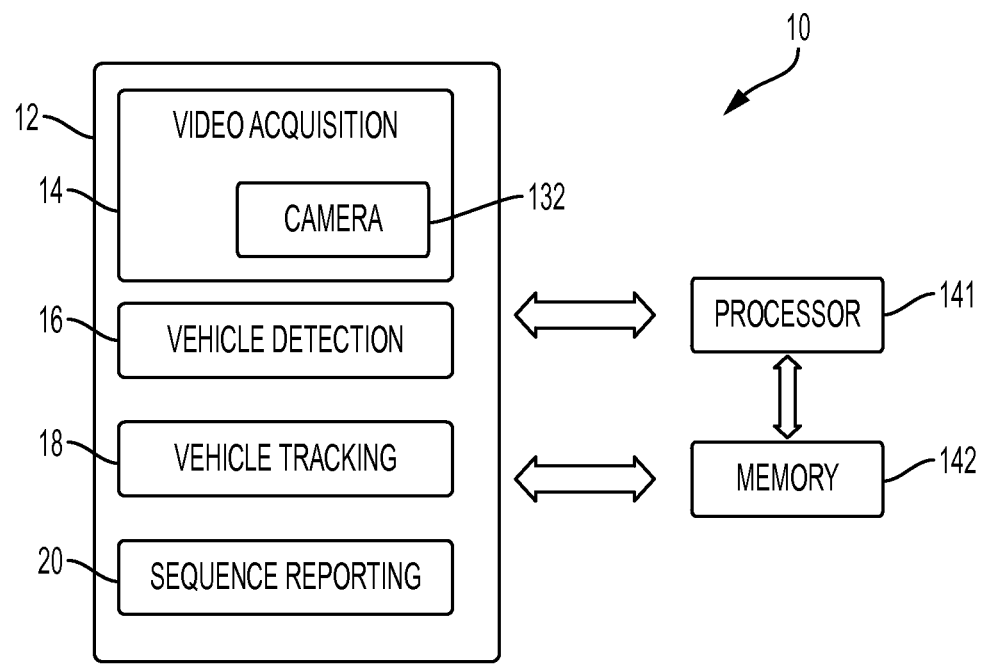
FIG. 2 illustrates an image- and/or video-based system that can be implemented in accordance with a preferred embodiment to improve vehicle detection performance in automated post-merge sequencing applications.

As used herein, the term "establishment" or variations thereof can be a general term that can refer to any place of business that can offer goods and/or services for sale and/or pick-up via a drive-thru window or similar system. For example, an establishment can be a restaurant, bank, postal service, coffee shop, dairy store, liquor store, pharmacy, and/or the like. Further, it should be appreciated that any type of hardware, software, and/or combinations thereof can be used to process the image data and perform the techniques and algorithms discussed herein FIG. 2 illustrates an image- and/or video-based system 10 that can be implemented in accordance with a preferred embodiment to improve vehicle detection performance in automated post-merge sequencing applications. System 10 can define multiple virtual detection loops (VDL) in a video and sequentially perform classification in each VDL, starting from the VDL closest to the order point, when a car ID is sitting in a queue to order and receive an item at an establishment. Note that the term "car ID" as utilized herein refers to an ID (Identification) or other identifying feature of a vehicle. For example, a license plate may be a car ID.

The system 10 can include a group of modules 12 that includes a video acquisition module 14 that utilizes one or more cameras 132 (e.g., an image-capturing unit) for acquiring video of the drive-thru of interest. A vehicle detection module 16 can also be implemented as part of the module(s) 12, which includes defining multiple VDLs in the video and sequential classification in the VDLs to detect vehicles as they are assigned to a car ID at the order point. A vehicle-tracking module 18 can also be provided, which tracks detected vehicles until they leave the monitored area. Finally, a sequence-reporting module 20 can report the assigned card IDs and the originating lanes as the vehicles proceed through the cash out point. The system 10 relies on an offline stage where features of manually labeled samples of cars crossing the VDLs are extracted and fed into classifiers for training; the trained classifiers are used during system operation. The module(s) 12 can communicate with a processor 141 and/or a memory 142. The modules(s) 12 contain instructions, which may be stored on memory 142 and processed via processor 141.

The video acquisition module 14 can include the user of one or more cameras that capture video of an area of interest. No specific requirements in terms of spatial or temporal resolutions are needed. However, traditional surveillance cameras are typically IP cameras with pixel resolutions of VGA and above (640×480) and frame rates of 15 fps and above. In a demonstration of an experimental embodiment, a point and shoot RGB camera with a 1280×720 pixel resolution and a frame rate of 30 fps has been used.

Figure 3:
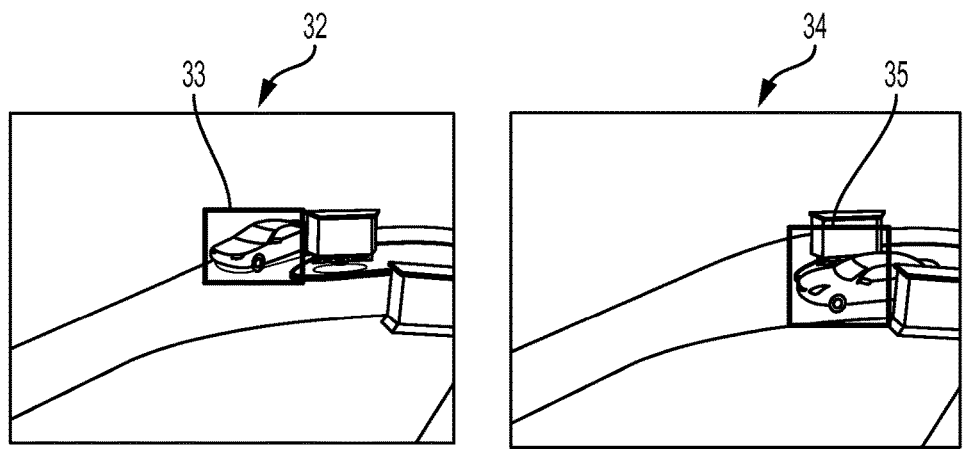
FIG. 3 illustrates images and two respective regions of interest defined for automated sequencing of vehicles in a side-by-side drive thru setting.

The vehicle detection module 16 can utilize multiple VDL's. Intuitively, vehicle detection should be performed at the order points as car Ds are assigned to vehicles through the restaurant POS system when an order is taken. Vehicle detection at the order point can be performed by defining two regions of interest, one for each order point, on the image plane. When a car ID is sitting in the queue for a specific order point, the algorithm tries to detect the vehicle at the order point through a classifier. FIG. 3, for example, illustrates images 32, 34 and two respective regions of interest 33, 35 defined for automated sequencing of vehicles in a side-by-side drive thru setting. Each of the ROI corresponds to one of the order points in the scene and can be defined manually on the camera installation. FIG. 3 depicts traditional VDLs defined for detecting vehicles coming from order point A and B on side-by-side drive-thru lanes.

Detection of vehicles is not always possible at the order point due to two reasons. The first reason is vehicle-to-vehicle or signage occlusions, wherein depending on the viewing angle of the camera relative to the merge point area, vehicles in one lane (e.g., usually the lane nearer to the camera) occlude vehicles in the other lane (e.g., usually the lane furthest from the camera) from the camera view, as illustrated by the example images 26, 28 shown in FIG. 1 (i.e., an inner lane van occludes the outer lane sedan shown in the images). Such vehicle-to-vehicle occlusions can render car detection at the order point challenging and even infeasible for some camera configurations. The second reason involves delays that occur in the car ID assignment process. A car ID can be assigned to a vehicle through a POS when an order is taken. The assignment process requires an input from the crew taking the order. This process may result in delays due to the manual input required by the crew; in which case the car will have left the order point by the time car ID is assigned, causing a missed detection in or by the algorithm.

Figure 4:
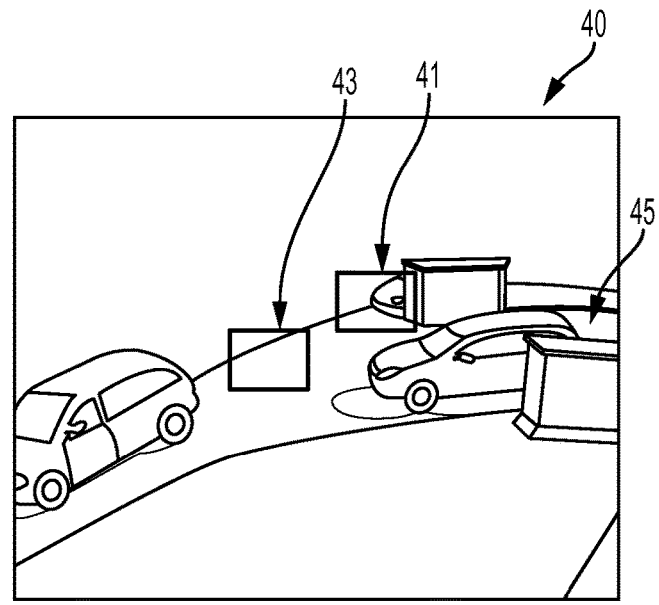
FIG. 4 illustrates an example image with multiple VDLs defined for detecting vehicles coming from a first (outer) order point.

FIG. 4 illustrates an example image 40 with multiple VDLs defined for detecting vehicles coming from a first order point 41. The first VD is defined at the order point and the second VDL at the merge point 43. Similarly, multiple VDLs can also be defined for detecting vehicles coming from a second order point 45. As the solution is rolled out across a large number of restaurants, the vehicle detection module 16 is desired to be more robust to variations in camera geometry, causing different levels of vehicle-to-vehicle occlusions, and be more robust to delays in the car ID assignment process caused by variations in operator procedure. In order to address this issue, this ID proposes a multi-stage vehicle detection process through the use of multiple VDLs defined on the image plane. One of the VDLs is defined at the order point as in the conventional case and the others are defined beyond the order point along the trajectory that a vehicle follows through the cash-out point.

A second VDL, for example, can be defined at the merge point or right after the merge point 43 as shown in FIG. 4. Defining the second VDL at or after the merge point is useful as vehicle-to-vehicle occlusion is avoided after the merge point so vehicles not being detected at the order point may be detected in the second VDL. For each defined VDL, a vehicle classifier is trained using a set of positive (vehicle) and negative (non-vehicle) samples extracted from the VDL. When a car ID is sitting in the queue for order point 41, the algorithm sequentially performs classification in each VDL, starting from the VDL closest to the order point.

If the classifier associated with the order point VDL provides a positive result, the car ID in the queue is assigned to the detected vehicle and a tracker is started without checking the other VDLs. If the first VDL gives a negative result, then the next VDL closest to the order point is checked until a vehicle is detected. If a vehicle is not detected in any of them, optionally, the highest score VDL can be considered as the location of the vehicle and the car ID can be assigned and the tracker can be started from there.

Similarly, multiple VDLs can be defined for detecting vehicles coming from order point 45 and classifiers for each defined VDL are trained. Some of the VDLs defined for order points 41 and 45 may coincide. For example, order points 41 and 45 may use the same VDL defined at the merge point shown in FIG. 4, but separate classifiers are needed to be trained for detecting vehicles coming from each order point, When a vehicle is detected in one of the VDLs before assigning the next car ID in the queue to the detected vehicle, the detected vehicle can optionally be checked if it corresponds to a vehicle already being tracked. This check ensures that only one tracker is assigned to a detected vehicle and hence, reduces the false alarms of the system. This check may depend on the tracking application used subsequently and can be performed in several ways including the following.

First, if a region based-tracking application is used (e.g., mean shift, particle filtering, etc.) for tracking, attributes (e.g., color histogram, histogram of oriented gradients, etc.) from the motion detected region can be extracted and compared with the attributes of the vehicles already being tracked. Second, if a region-based tracking algorithm (e.g., mean shift, particle filtering, etc.) is used, the distance of the detected motion blob can be calculated to each of the vehicles already being tracked on the image plane. If the detected motion blob is far enough from the vehicles already being tracked, then a new tracker is started for the detected vehicle. Third, If a point tracker is used (e.g., KLT tracking [Kanade-Lucas-Tomasi]) for tracking), a set of features can be extracted from the motion detected region and these features are compared with the set of features already being tracked. If more than a certain number of features are matched, then a conclusion can be reached that the vehicle is already being tracked.

If a point tracker is used (e.g., KLT tracking) for tracking, the number of currently tracked features can be calculated in the motion detected region. A new tracker is started only if the number of currently tracked features in the motion detected region is less than a specified threshold. The logic behind this approach is based on the assumption that when an already tracked vehicle is moving, the motion detected region will include the tracked vehicle and a set of features already being tracked.

If the detected vehicle is not in the list of vehicles already being tracked, a set of Attributes/features can be extracted from the vehicle-part-detected region. The extracted attributes/features depend on the type of the tracker used. If a point tracker (e.g., KLT) is used for tracking, the extracted features may include one or more of the following: scale invariant features such as scale invariant feature transform (SIFT) features or speeded up robust features (SURF); interesting points such as Harris corner features, fast accelerated segment test (FAST) or minimum Eigen value algorithm features; or maximally stable extremal region (MSER) features.

If a region-based tracker is used (e.g., mean shift, particle filtering, etc.) for tracking, the set of extracted attributes include one or more of the following: color attributes of the detected region (e.g., color histogram or other color statistics extracted from the region); geometric attributes of the detected blob (e.g., orientation, aspect ratio, eccentricity, etc.); and shape attributes extracted from the detected region (e.g., histogram of oriented gradients, histogram of edges, corners, etc.).

After extracting a set of features/attributes from the detected region, they are tracked across the frames of the captured video. The tracking is performed as long as the vehicle stays within FOV of the camera. Several alternative tracking techniques such as Mean-Shift Tracking, Contour Tracking, Kalman filtering, KLT tracking, and Particle Filtering can be employed in this step or operation.

Based on the outputs of the vehicle detection module 16 and the vehicle tracking module 18, the sequence report module 20 can report the temporal sequence of the merging vehicles. The originating lane of a vehicle is determined in the vehicle detection module 16 through the use of multiple VDLs, and the detected vehicle is tracked across the video as described earlier. The sequence report module 20 reports the assigned card ID and the originating lane as the vehicle proceeds through the cash out point.

Some embodiments have been implemented in the context of experimental embodiments. For example, the performance of the vehicle detection module 16 has been evaluated in the context of experiments involving detecting vehicles coming from a first order point. In this case, the VDLs were defined as discussed herein and two classifiers were trained, namely order point and merge point classifiers. In the experimental implementation, classifiers were trained on HOG features calculated from 150×150 pixel training images for merge point classifier and from 115×75 pixel training images for the order point classifier. The training samples were extracted from, for example, a manually annotated two-hour lunch-time video with a 1280×720 pixel resolution and a frame rate of 30 fps. It can be appreciated that such parameters for pixel training images and pixel resolution and frame rates are discussed herein for illustrative purposes only and are not considered limiting features of the disclosed embodiments.

The order point classifier was trained with 115 positive and 68 negative samples, and the merge point classifier was trained with 108 positive and 56 negative samples. The positive samples for the order point classifier included images having the front portion of the vehicles when they first enter into the window and the positive samples for the merge point classifier included either front or rear portion of the vehicles. The negative samples for the order point classifier were extracted from the positive samples for the merge point classifier and the negative samples for the merge point classifier were extracted from the positive samples for the order point classifier. The negative samples for the classifiers mostly included images from background. Only one positive sample is extracted per vehicle. Using both the positive and negative samples, two linear SVM (Support Vector Machine) classifiers were trained.

Figure 5:
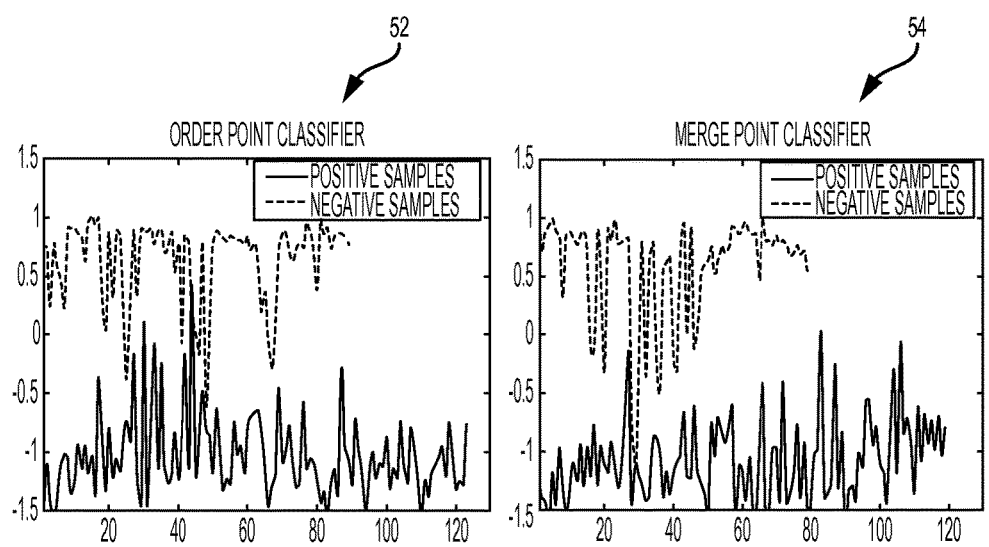
FIG. 5 illustrates a graph depicting experimental data with respect to an order point classifier and a graph showing experimental data with respect to a merge point classifier, in accordance with an experimental embodiment.

FIG. 5 illustrates a graph 52 depicting experimental data with respect to an order point classifier and a graph 54 showing experimental data with respect to a merge point classifier, in accordance with an experimental embodiment. FIG. 5 demonstrates the performance of order point and merge point classifiers for the same set of vehicles observed at the order and merge point, respectively. Having the second classifier in addition to the classifier at the order point resulted in a catch of two misses that the order point classifier missed and hence, helped to improve the detection performance.

After training, the performance of the classifiers was tested on a set of sample video frames extracted from, for example, a manually annotated two-hour video captured in high traffic with a 1280×720 pixel resolution and a frame rate of 30 fps. In this particular example, the classifiers were only run with respect to frames manually annotated when there is a vehicle either at the order point or at the merge point. Thus, the same vehicle that appeared at the order point and at the merge point was classified by using the corresponding classifier and detection rates.

Similar to training, the negative samples for the order point classifier were extracted from the positive samples for the merge point classifier and the negative samples for the merge point classifier were extracted from the positive samples for the order point classifier. The reason for this is because when there is a vehicle at the merge point, there is no vehicle at the order point and vice versa. So the frames extracted for positive samples for the merge point classifier can be used to extract negative samples for the order point classifier. In total, the test set for either classifier included 120 positive images and ~80 negative images.

FIG. 5 demonstrated the sample scores obtained for the images included in the test set using the order and merge point classifiers. When the detection threshold is set to 0, the order point classifier missed 2 vehicles and using the second classifier in addition to the classifier at the order point caught 2 misses that the order point classifier missed and hence, helped to improve the detection performance. The false positives are not a major concern in this application because a car ID is assigned only when an order is taken. The false positives caused by classifiers can easily be eliminated if there is no car ID sitting in the queue.

It should be appreciated that the detection portion (e.g., "virtual detection loop") of the disclosed embodiments represents only a piece of the overall concept (i.e., the multi-stage classification approach being more the heart of the idea). For the detection, we are not defining a virtual line within the scene that serves as a "tripwire". Instead, we define regions of interest in which an image based classifier is run to determine if a vehicle is found within that ROI or riot. There is thus not a "line" that serves as the trigger point as there is, for example, in the case of a tripwire system.

As can be appreciated by one skilled in the art, embodiments can be implemented in the context of a method, data processing system, or computer program product. Accordingly, embodiments may take the form of an entire hardware embodiment, an entire software embodiment or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, 802.xx, and cellular network or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 6:
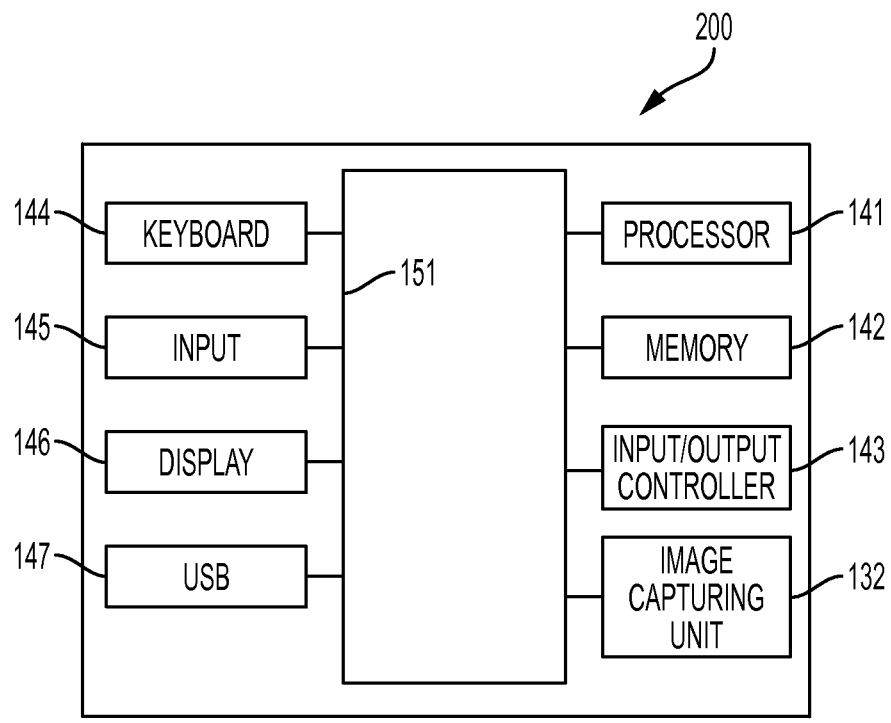
FIG. 6 illustrates a schematic view of a computer system, in accordance with an embodiment.
Figure 7:
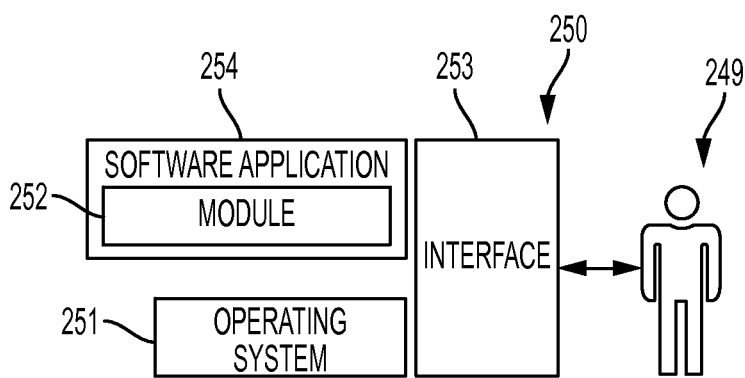
FIG. 7 illustrates a schematic view of a software system including a module, an operating system, and a user interface, in accordance with an embodiment.

FIGS. 6-7 are provided as exemplary diagrams of data-processing environments in which embodiments of the present invention may be implemented. It should be appreciated that FIGS. 6-7 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 6, some embodiments may be implemented in the context of a data-processing system 200 that includes, for example, a processor 141, a memory 142, an input/output controller 143, an image capturing unit or camera(s) 132, a keyboard 144, an input device 145 (e.g., a pointing device, such as a mouse, track ball, and pen device, etc.), a display 146, and a USB (Universal Serial Bus) peripheral connection 147. As illustrated, the various components of data-processing system 200 can communicate electronically through a system bus 151 or similar architecture. The system bus 151 may be, for example, a subsystem that transfers data between, for example, computer components within data-processing system 200 or to and from other data-processing devices, components, computers, etc. Note that the image capturing unit or camera(s) 132 can be deployed as or with, for example, the video acquisition module 14 shown in FIG. 1 and discussed herein.

FIG. 7 illustrates a computer software system 250 for directing the operation of the data-processing system 200 depicted in FIG. 6. Software application 254, stored for example in the memory 142, generally includes a module. The computer software system 250 further includes a kernel or operating system 251 and a shell or interface 253. One or more application programs, such as software application 254, may be "loaded" (i.e., transferred from, for example, a mass storage or other memory location into the memory 142) for execution by the data-processing system 200. The data-processing system 200 can receive user commands and data through an interface 253; these inputs may then be acted upon by the data-processing system 200 in accordance with instructions from operating system 251 and/or software application 254. The interface 253 in some embodiments can serve to display results, whereupon a user may supply additional inputs or terminate a session. The software application 254 can include a module 252 that can be implemented as, for example module(s) 12 discussed herein.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. The module 252 shown in FIG. 7 can thus implement instructions such as those shown and described and illustrated herein (e.g., module(s) 12 shown in FIG. 2).

FIGS. 6-7 are intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Based on the foregoing, it can be appreciated that a number of embodiments, preferred and alternative, are disclosed. For example, in one embodiment, a multi-stage vehicle detection system for side-by-side drive-thru configurations can be implemented. Such a system can include, for example, one or more video cameras for capturing video of a drive-thru of interest in a monitored area, and a group of modules (or, for example, a single module composed of sub-modules) that defines multiple virtual detection loops in the video and sequentially performs classification with respect to each virtual detection loop among the multiple virtual detection loops, starting from a virtual detection loop closest to an order point, and when a vehicle having a car ID is sitting in a drive-thru queue, so as to improve vehicle detection performance in automated post-merge sequencing.

In some embodiments, the modules may include a video acquisition module including the video camera(s) that acquires the video of the drive-thru of interest; a vehicle detection module that defines the multiple virtual detection loops in the video and sequential classification in the virtual detection loop to detect vehicles as they are assigned to the car ID at the order point; a vehicle tracking module that tracks detected vehicles until the detected vehicles leave the monitored area; and a sequence reporting module that reports an assigned car ID and originating lanes as vehicles proceed through a cash out point.

One or more classifiers can also be provided as a part of such a system, wherein the classifier (or classifiers) performs the classification. In some embodiments, an offline stage can be provided wherein features of manually labeled samples of vehicles crossing the virtual detection loops are extracted and fed into the classifier(s) for training and wherein the classifier(s) after training is employed within the system. The classifier(s) may be, for example, an order point classifier and/or a merge point classifier.

In another embodiment, a multi-stage vehicle detection system for side-by-side drive-thru configurations can be implemented. Such a system can include, for example, one or more video cameras: a processor that communicates with the video camera(s); and a computer-usable medium embodying computer program code, the computer-usable medium capable of communicating with the processor. The computer program code can include instructions executable by the processor and configured, for example, for: capturing via the video camera(s), video of a drive-thru of interest in a monitored area; defining multiple virtual detection loops in the video; and sequentially performing a classification with respect to each virtual detection loop among the multiple virtual detection loops, starting from a virtual detection loop closest to an order point, and when a vehicle having a car ID is sitting in a drive-thru queue, so as to improve vehicle detection performance in automated post-merge sequencing.

In another embodiment, such a system can include, for example, a video acquisition module including the video camera(s) that acquires the video of the drive-thru of interest; a vehicle detection module that defines the multiple virtual detection loops in the video and sequential classification in the virtual detection loop to detect vehicles as they are assigned to the car ID at the order point; a vehicle tracking module that tracks detected vehicles until the detected vehicles leave the monitored area; and a sequence reporting module that reports an assigned car ID and originating lanes as vehicles proceed through a cash out point. One or more classifiers can be provided, which performs the classification.

In another embodiment, such instructions can be further configured for in an offline stage, extracting and feeding manually labeled samples of vehicles crossing the virtual detection loops into the classifier for training and wherein the classifier after training is employed within the system. The classifier can be, for example, an order point classifier and/or a merge point classifier.

In yet another embodiment, a multi-stage vehicle detection method for side-by-side drive-thru configurations can be implemented. Such a method can include, for example, steps or logical operations for capturing video of a drive-thru of interest in a monitored area utilizing one or more video cameras; and providing a group of modules for a single module composed of sub-modules) that defines multiple virtual detection loops in the video and sequentially performs classification with respect to each virtual detection loop among the multiple virtual detection loops, starting from a virtual detection loop closest to an order point, and when a vehicle having a car ID is sitting in a drive-thru queue, so as to improve vehicle detection performance in automated post-merge sequencing.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

The invention claimed is:

1. A multi-stage vehicle detection system for side-by-side drive-thru configurations, said system comprising:
   a plurality of classifiers associated with at least one video camera for capturing video of a drive-thru of interest in a monitored area monitored by said at least one video camera;
   a plurality of modules that defines multiple virtual detection loops in said video and sequentially performs classification for an automated post-merge sequencing application via at least one classifier among said plurality of classifiers with respect to each virtual detection loop among said multiple virtual detection loops, starting from a virtual detection loop closest to an order point, and when a vehicle having a car ID is sitting in a drive-thru queue, so as to improve vehicle detection performance in automated post-merge sequencing of said automated post-merge sequencing application and wherein said multiple virtual detection loops are defined for said automated post-merge sequencing application for detecting vehicles coming from a first order point, wherein a first virtual detection loop among said multiple virtual detection loops is defined at first said first order point and wherein a second virtual detection loop among said multiple virtual detection loops is defined at a merge point or after said merge point, or wherein said virtual detection loops are defined for detecting said vehicles from a second order point;

wherein at least one classifier among said plurality of classifiers performs said classification, and wherein for each defined virtual detection loop among said multiple virtual detection loops, said at least one classifier is trained using a set of positive samples and a set of negative samples extracted from at least one virtual detection loop among said virtual detection loops, wherein said positive samples among said set of positive samples comprise vehicle data extracted from said at least one virtual detection loop and said negative samples among said set of negative samples comprise non-vehicle data extracted from said at least one virtual detection loop; and wherein said plurality of modules include:

a video acquisition module comprising said at least one video camera that acquires said video of said drive-thru of interest;

a vehicle detection module that defines said multiple virtual detection loops in said video and sequential classification in said virtual detection loop to detect vehicles as each vehicle among said vehicles is assigned to said car ID at said order point;

a vehicle tracker that tracks detected vehicles until said detected vehicles leave said monitored area, wherein said vehicle tracker comprises at least one of a point tracker and a region-based tracker and wherein a new tracker is started only if a number of currently tracked features in a motion-detected region is less than a specified threshold, and wherein if said point tracker is used for said tracking, extracted features from said tracking include at least one of SIFT (Scale Invariant Feature Transform) features, SURF (Speeded Up Robust Feature) features, Harris corner features, FAST (Fast Accelerated Segment Test) features, Eigen value algorithm features, and MSER (Maximally Stable Extremal Region) features, and if said region-based tracker is used for said tracking extracted attributes from said tracking include color attributes of a detected region, geometric attributes of a detected blob and shape attributes extracted from said detected region, wherein said geometric attributes comprise an orientation, an aspect ratio and an eccentricity; and a sequence reporting module that reports an assigned car ID and originating lanes as vehicles proceed through a cash out point at said drive-thru and wherein based on outputs from said vehicle detection module and said vehicle tracking module, said sequence reporting module reports a temporal sequence of merging vehicles among said vehicles.

2. The system of claim 1 wherein said at least one camera comprises a point and shoot RGB camera and wherein said drive-thru of interest comprises a plurality of regions of interest, wherein each region of interest among said regions of interests corresponds to an order point of said drive-thru in a scene captured by said at least one camera wherein said each region of interest is defined per an installation of said at least one camera.

3. The system of claim 1 further comprising an offline stage wherein features of manually labeled samples of vehicles crossing said multiple virtual detection loops are extracted and fed into said plurality of classifiers for training and wherein said plurality of classifiers after training is employed within said system and wherein at least two classifiers among said plurality of classifiers comprise linear SVM (Support Vector Machine) classifiers trained using both said positive samples and said negative samples and wherein said negative samples with respect to said order point are extracted from positive samples for said merge point and said negative samples for said merge point are extracted from positive samples with respect to said order point.

4. The system of claim 3 wherein said at least one classifier comprises an order point classifier with respect to an order point at said drive-thru.

5. The system of claim 4 wherein said at least one classifier further comprises a merge point classifier with respect to said merge point at said drive-thru.

6. The system of claim 1 further comprising:

an offline stage wherein features of manually labeled samples of vehicles crossing said virtual detection loops are extracted and fed into said at least one classifier for training and wherein said at least one classifier after training is employed within said system; and wherein said new tracker further comprises a point tracker that tracks a number of currently tracked features in said motion-detected region.

7. The system of claim 6 wherein plurality of classifiers includes an order point classifier with respect to said order point including said first and second order points at said drive-thru and a merge point classifier with respect to a merge point at said drive-thru and wherein said order point classifier and said merge point classifier are trained on HOG features calculated from pixel training images.

8. A multi-stage vehicle detection system for side-by-side drive-thru configurations, said system comprising:

at least one video camera and a plurality of classifiers;

a processor that communicates with said at least one video camera and said at least one classifier; and a computer-usable medium embodying computer program code, said computer-usable medium capable of communicating with the processor, said computer program code comprising instructions executable by said processor and configured for:

monitoring a monitored area with said at least one video camera in association with said plurality of classifiers;

capturing via said at least one video camera, video of a drive-thru of interest in said monitored area;

defining multiple virtual detection loops in said video;

sequentially performing a classification for an automated post-merge sequencing application via at least one classifier among said plurality of classifiers with respect to each virtual detection loop among said multiple virtual detection loops, starting from a virtual detection loop closest to an order point, and when a vehicle having a car ID is sitting in a drive-thru queue, so as to improve vehicle detection performance in automated post-merge sequencing of said automated post-merge sequencing application, wherein said multiple virtual detection loops are defined for said automated post-merge sequencing application for detecting vehicles coming from a first order point, wherein a first virtual detection loop among said multiple virtual detection loops is defined at first said first order point and wherein a second virtual detection loop among said multiple virtual detection loops is defined at a merge point or after said merge point, or wherein said virtual detection loops are defined for detecting said vehicles from a second order point;

wherein at least one classifier among said plurality of classifiers performs said classification, and wherein for each defined virtual detection loop among said multiple virtual detection loops, said at least one classifier is trained using a set of positive samples and a set of negative samples extracted from at least one virtual detection loop among said virtual detection loops, wherein said positive samples among said set of positive samples comprise vehicle data extracted from said at least one virtual detection loop and said negative samples among said set of negative samples comprise non-vehicle data extracted from said at least one virtual detection loop; and wherein said plurality of modules comprises:
- a video acquisition module comprising said at least one video camera that acquires said video of said drive-thru of interest;
- a vehicle detection module that defines said multiple virtual detection loops in said video and sequential classification in said virtual detection loop to detect vehicles as each vehicle among said vehicles is assigned to said car ID at said order point;
- a vehicle tracker that tracks detected vehicles until said detected vehicles leave said monitored area, wherein said vehicle tracker comprises at least one of a point tracker and a region-based tracker and wherein a new tracker is started only if a number of currently tracked features in a motion-detected region is less than a specified threshold, and wherein if said point tracker is used for said tracking, extracted features from said tracking include at least one of SIFT (Scale Invariant Feature Transform) features, SURF (Speeded Up Robust Feature) features, Harris corner features, FAST (Fast Accelerated Segment Test) features, Eigen value algorithm features, and MSER (Maximally Stable Extremal Region) features, and if said region-based tracker is used for said tracking extracted attributes from said tracking include color attributes of a detected region, geometric attributes of a detected blob and shape attributes extracted from said detected region, wherein said geometric attributes comprise an orientation, an aspect ratio and an eccentricity; and
- a sequence reporting module that reports an assigned car ID and originating lanes as vehicles proceed through a cash out point at said drive-thru and wherein based on outputs from said vehicle detection module and said vehicle tracking module, said sequence reporting module reports a temporal sequence of merging vehicles among said vehicles.

9. The system of claim 8 wherein said at least one camera comprises a point and shoot RGB camera and wherein said drive-thru of interest comprises a plurality of regions of interest, wherein each region of interest among said regions of interests corresponds to an order point of said drive-thru in a scene captured by said at least one camera wherein said each region of interest is defined per an installation of said at least one camera.

10. The system of claim 9 wherein said instructions are further configured for in an offline stage extracting and feeding manually labeled samples of vehicles crossing said virtual detection loops into said at least one classifier for training and wherein said at least one classifier after training is employed within said system; and wherein said new tracker further comprises a point tracker that tracks a number of currently tracked features in said motion-detected region.

11. The system of claim 10 wherein said at least one classifier comprises an order point classifier with respect to an order point at said drive-thru.

12. The system of claim 11 wherein said at least one classifier comprises a merge point classifier with respect to said merge point at said drive-thru and wherein said order point classifier and said merge point classifier are trained on HOG features calculated from pixel training images.

13. The system of claim 10 further comprising:
- an offline stage wherein features of manually labeled samples of vehicles crossing said virtual detection loops are extracted and fed into said plurality of classifiers for training and wherein said plurality of classifiers after training is employed within said system and wherein at least two classifiers among said plurality of classifiers comprise linear SVM (Support Vector Machine) classifiers trained using both said positive samples and said negative samples and wherein said negative samples with respect to said order point are extracted from positive samples for said merge point and said negative samples for said merge point are extracted from positive samples with respect to said order point.

14. A multi-stage vehicle detection method for side-by-side drive-thru configurations, said method comprising:
- capturing video of a drive-thru of interest in a monitored area utilizing at least one video camera associated with a plurality of classifiers; and
- providing a plurality of modules that defines multiple virtual detection loops in said video and sequentially performs classification for an automated post-merge sequencing application via at least one classifier among said plurality of classifiers with respect to each virtual detection loop among said multiple virtual detection loops, starting from a virtual detection loop closest to an order point, and when a vehicle having a car ID is sitting in a drive-thru queue, so as to improve vehicle detection performance in automated post-merge sequencing of said automated post-merge sequencing application, wherein said multiple virtual detection loops are defined for said automated post-merge sequencing application for detecting vehicles coming from a first order point, wherein a first virtual detection loop among said multiple virtual detection loops is defined at first said first order point and wherein a second virtual detection loop among said multiple virtual detection loops is defined at a merge point or after said merge point, or wherein said virtual detection loops are defined for detecting said vehicles from a second order point; and
- wherein at least one classifier among said plurality of classifiers performs said classification, and wherein for each defined virtual detection loop among said multiple virtual detection loops, said at least one classifier is trained using a set of positive samples and a set of negative samples extracted from at least one virtual detection loop among said virtual detection loops, wherein said positive samples among said set of positive samples comprise vehicle data extracted from said at least one virtual detection loop and said negative samples among said set of negative samples comprise non-vehicle data extracted from said at least one virtual detection loop; and wherein said plurality of modules comprises:

a video acquisition module comprising said at least one video camera that acquires said video of said drive-thru of interest;

a vehicle detection module that defines said multiple virtual detection loops in said video and sequential classification in said virtual detection loop to detect vehicles as each vehicle among said vehicles is assigned to said car ID at said order point;

a vehicle tracker that tracks detected vehicles until said detected vehicles leave said monitored area, wherein said vehicle tracker comprises a-at least one of a point tracker and a region-based tracker and wherein a new tracker is started only if a number of currently tracked features in a motion-detected region is less than a specified threshold, and wherein if said point tracker is used for said tracking, extracted features from said tracking include at least one of SIFT (Scale Invariant Feature Transform) features, SURF (Speeded Up Robust Feature) features, Harris corner features, FAST (Fast Accelerated Segment Test) features, Eigen value algorithm features, and MSER (Maximally Stable Extremal Region) features, and if said region-based tracker is used for said tracking extracted attributes from said tracking include color attributes of a detected region, geometric attributes of a detected blob and shape attributes extracted from said detected region, wherein said geometric attributes comprise an orientation, an aspect ratio and an eccentricity; and a sequence reporting module that reports an assigned car ID and originating lanes as vehicles proceed through a cash out point at said drive-thru and wherein based on outputs from said vehicle detection module and said vehicle tracking module, said sequence reporting module reports a temporal sequence of merging vehicles among said vehicles.

15. The method of claim 14 wherein said at least one camera comprises a point and shoot RGB camera and wherein said drive-thru of interest comprises a plurality of regions of interest, wherein each region of interest among said regions of interests corresponds to an order point of said drive-thru in a scene captured by said at least one camera wherein said each region of interest is defined per an installation of said at least one camera.

16. The method of claim 14 further comprising in an offline stage extracting and feeding said features of manually labeled samples of vehicles crossing said virtual detection loops into said plurality of classifiers for training and wherein said plurality of classifiers after training is employed within said system, and wherein said new tracker further comprises a point tracker that tracks a number of currently tracked features in said motion-detected region based on an assumption that when an already tracked vehicle is moving, said motion-detected region includes said tracked vehicle and a set of feature already being tracked, and at least two classifiers among said plurality of classifiers comprise linear SVM (Support Vector Machine) classifiers trained using both said positive samples and said negative samples and wherein said negative samples with respect to said order point are extracted from positive samples for said merge point and said negative samples for said merge point are extracted from positive samples with respect to said order point.

17. The method of claim 16 further comprising configuring said at least one classifier among said at least two classifiers to function as an order point classifier with respect to said order point and at least one other classifier among said at least two classifiers to comprises a merge point classifier with respect to said merge point wherein said order point classifier and said merge point classifier are trained on HOG features calculated from pixel training images.

* * * * *